(12) United States Patent
Dorrer

(10) Patent No.: US 11,751,270 B2
(45) Date of Patent: Sep. 5, 2023

(54) APPARATUS AND METHOD FOR ACHIEVING HIGHER SECURITY ON RE-PAIRING

(71) Applicant: Siemens Aktiengesellschaft, Munich (DE)

(72) Inventor: Johann Dorrer, Neunburg V. Wald (DE)

(73) Assignee: Siemens Aktiengesellschaft, Munich (DE)

( * ) Notice: Subject to any disclaimer, the term of this patent is extended or adjusted under 35 U.S.C. 154(b) by 101 days.

(21) Appl. No.: 17/143,271

(22) Filed: Jan. 7, 2021

(65) Prior Publication Data

US 2021/0219367 A1    Jul. 15, 2021

(30) Foreign Application Priority Data

Jan. 14, 2020   (DE) .................... 10 2020 200 392.0

(51) Int. Cl.
*H04W 76/19* (2018.01)
*H04W 76/25* (2018.01)
*H04W 76/15* (2018.01)

(52) U.S. Cl.
CPC .......... *H04W 76/19* (2018.02); *H04W 76/15* (2018.02); *H04W 76/25* (2018.02)

(58) Field of Classification Search
CPC ..... H04W 76/19; H04W 76/15; H04W 76/25; H04W 12/04; H04W 12/50; H04W 4/38; H04W 56/0015; H01H 85/34; H01H 2085/0266; H01H 2085/0275; H01H 2085/0291; H01H 85/044; H01H 85/30;

(Continued)

(56) References Cited

U.S. PATENT DOCUMENTS

2007/0297609 A1   12/2007  Adams et al.
2009/0279518 A1   11/2009  Falk et al.
(Continued)

FOREIGN PATENT DOCUMENTS

DE   102018213522 A1   2/2020
EP       1892913 A1    2/2008

OTHER PUBLICATIONS

German Office Action dated Sep. 8, 2020.

*Primary Examiner* — Jamaal Henson
*Assistant Examiner* — Mohammed M Murshid
(74) *Attorney, Agent, or Firm* — Harness, Dickey & Pierce, P.L.C.

(57) ABSTRACT

For providing data of an apparatus for applications, routing of the data via a communication node is provided. In this case, the apparatus communicates the data wirelessly to the communication node. This necessitates pairing the apparatus with the communication node beforehand, which is carried out with the aid of an installation key. The data transfer itself is then secured with a connection key defined during the pairing. If replacing or reconnecting the communication node necessitates carrying out re-pairing, at least one criterion relating to the reachability of the communication node is checked and the lack of reachability as per the criterion is made into the prerequisite for using the installation key instead of the connection key for re-pairing. At least one embodiment of the invention increases protection against interferers wanting to access the apparatus in an unauthorized manner.

9 Claims, 7 Drawing Sheets

(58) Field of Classification Search
CPC . G08C 2201/20; G08C 17/02; H04L 2209/80; H04L 9/12; H04L 9/0822; H04Q 2209/40; H04Q 2209/826; H04Q 9/00; H04J 3/0667
See application file for complete search history.

(56) References Cited

U.S. PATENT DOCUMENTS

| | | | |
|---|---|---|---|
| 2015/0003433 A1* | 1/2015 | Sinha | H04L 63/18 370/338 |
| 2016/0061960 A1* | 3/2016 | Matsue | G01S 19/34 368/47 |
| 2016/0360404 A1* | 12/2016 | Benoit | H04W 12/04 |
| 2017/0034867 A1* | 2/2017 | Oshida | H04W 72/0446 |
| 2017/0118235 A1* | 4/2017 | Kang | H04L 43/0876 |
| 2017/0149806 A1 | 5/2017 | Beals | |
| 2019/0253267 A1* | 8/2019 | Ambrosino | H04B 3/54 |
| 2019/0273612 A1* | 9/2019 | Sinha | H04J 3/0667 |
| 2020/0008050 A1* | 1/2020 | Freeman | H04L 67/34 |
| 2020/0051768 A1 | 2/2020 | Moebis et al. | |
| 2020/0136378 A1* | 4/2020 | Finis | H01C 7/12 |

\* cited by examiner

Man-in-the-Middle / Manipulation

APPARATUS AND METHOD FOR ACHIEVING HIGHER SECURITY ON RE-PAIRING

PRIORITY STATEMENT

The present application hereby claims priority under 35 U.S.C. § 119 to German patent application number DE 102020200392.0 filed Jan. 14, 2020, the entire contents of each of which are hereby incorporated herein by reference.

FIELD

Embodiments of the invention generally relate to an apparatus for measuring or generating data, a method for securing re-pairing of such an apparatus, and a storage medium for storing software for carrying out a method according to an embodiment of the invention.

BACKGROUND

What is at present perhaps the most important development affecting virtually all areas of technology, and often referred to as "digitization" concerns the use of data on a large scale. This is based on the measurement or generation of data as are provided for applications on the Internet or in the Cloud. The applications may then serve e.g. for monitoring, controlling or optimizing devices or systems.

In the course of this development, apparatuses used in industry or privately are being upgraded for the communication or transfer of data. Dedicated nodes are often employed when there are relatively large volumes of data, the apparatuses transmitting their data to the nodes and the data then being made available in the Cloud via the nodes. The nodes are also referred to as data collector or data concentrator. They usually also allow the data streams to be adapted according to the requirements of applications and the technical conditions appertaining to transfer.

In order to afford a better understanding, a concrete situation is presented below concerning low-voltage protection apparatuses that have been upgraded for communication with the communication protocol Zigbee. However, it should already be pointed out at this juncture that the invention presented hereinafter is not restricted either to devices in the range of low voltages or to the Zigbee protocol.

In the low-voltage range, various apparatuses are used for the protection of electrical circuits. One category concerns line protection. For the corresponding apparatuses the English abbreviation CP (circuit protection) is often used to characterize these apparatuses. The latter can be circuit-breakers, which after tripping, e.g. in the event of a short circuit or overcurrent, are switched on again (for example a so-called molded circuit breaker or MCB), or fuses, which have to be replaced once they have tripped (e.g. fusible link). In addition, there are further protection apparatuses that trip for other fault characteristics, e.g. residual current circuit-breakers (for example a so-called residual current device or RCD) or fire protection circuit-breakers (e.g. arc fault detection device or AFDD). All these and comparable apparatuses are hereinafter subsumed under the term low-voltage protection apparatus.

One important development is directed toward making available data obtained in the case of low-voltage protection apparatuses as well, in order to extend the monitoring and control possibilities. For this purpose, these apparatuses are usually provided with additional sensors and are obligatorily provided with a transmission function. This is explained in greater detail below based upon a fusible link (which was disclosed for the first time in the German application having the application number DE 20 2018 213 522.3).

FIG. 1 schematically shows the basic construction of a fusible link 1. The latter comprises two connection elements 3, which consist of an electrically conductive material, for example copper. The connection elements 3 are mechanically fixedly and tightly connected to a protective housing 2, which consists of a solid, nonconductive material that is as heat-resistant as possible, for example of a ceramic. The protective housing 2 generally has a tubular or hollow-cylindrical basic shape and is closed in pressure-tight fashion toward the outside, for example with the aid of two closure caps 4. Arranged in the fusible link 1 is a so-called fusible conductor 5, which electrically conductively connects the two connection elements 3 to one another.

The fusible conductor 5 generally consists of a material with good conductivity, such as copper or silver. If a current in the overload range of the fusible link 1 flows, then the temperature within the fusible link 1 continuously rises further until the melting point of the fusible conductor 5 is exceeded and the latter melts. Reaction between the melt and an extinguishing medium provided in the interior results in an interruption in the current flow between the connection elements 3. The fusible link 1 comprises a further housing 12 besides the protective housing 2. Arranged in the further housing 12 is a measuring apparatus 10 comprising a sensor element 11 for detecting a physical state measurement value of the fusible link 1 and also a transmitting device 13 for transmitting the measurement value to a receiving apparatus (not illustrated) arranged outside the fusible link 1. In the present case, the sensor element 11 is embodied as a current transformer for measuring an electric current I flowing through the fusible link 1; alternatively or additionally, however, other sensor elements, for example a Hall sensor or a temperature sensor, are also appropriate for this.

The sensor element 11 is electrically conductively connected to a processing device 14. The latter is illustrated schematically as a printed circuit board in the example embodiment illustrated in the figure, the printed circuit board being populated with components suitable for processing the measurement signal. A transmitting device 13 is furthermore provided, which is likewise electrically conductively connected to the processing device 14 illustrated as a printed circuit board. In the course of this example, the transmitting device 13 is a communication module configured for the Zigbee transmission standard.

For providing data from low-voltage protection apparatuses such as the fusible link from FIG. 1 in the Cloud, it is expedient to realize this by way of an apparatus for aggregating data from a plurality of apparatuses. FIG. 2 shows how a plurality of low-voltage elements (e.g. low-voltage protection apparatuses or breakers) B1, B2, B3 are wirelessly connected to a data collector (DC) or data concentrator. Communication proceeds by way of Zigbee here. Via the data collector DC, it is then possible to transmit data for applications into the Cloud directly or indirectly. The data concentrator enables the provision of data in the Cloud to be made flexible e.g. with regard to settings, data adaptations and transmission options.

In order to establish secure communication between a data collector and a low-voltage protection apparatus, pairing of the two devices is carried out. In the case of a Zigbee connection, for example, in this case an installation key is exchanged between the two devices by way of the pairing method (secure pairing). In a further step, the installation key is replaced by a new key. This new key is then stored in the low-voltage protection apparatus.

The Zigbee protocol supports two different security models, a centralized security model and a distributed security model. The centralized security model acts by securing individual connections, for which purpose a dedicated key (link key) is generated and provided by an entity provided for this purpose (referred to as a "Trust Center" in this standard). The distributed security model operates with a key which is public within a network (network key), but this is associated with curtailments of security. Therefore, in the example described, the Zigbee connection is safeguarded in the context of the centralized security model. If the new key (link key) is then active, the low-voltage protection apparatus cannot straightforwardly be connected to a new data collector since no key is available for re-pairing. This problem can be avoided by the use of the distributed security model, where a public key that is identical for every device is used. Although this use of a public key would eliminate the described problem in the case of pairing with a new data collector, it would result in reduced security. In particular, communication security cannot be ensured in the case of a so-called "man-in-the-middle" attack (FIG. 3).

SUMMARY

The inventors have discovered that there is a need for apparatuses and methods which ensure secure pairing in the case of reconnecting to a communication node, such as e.g. a data collector.

Embodiments of the invention specify an apparatus and a method for pairing.

Embodiments are directed to an apparatus, a method and a storage medium.

At least one embodiment of the invention relates to an apparatus for measuring or generating data.

At least one embodiment of the invention relates to an apparatus for measuring or generating data, comprising:
an integrated transmitting and receiving module for wirelessly communicating the data to a communication node via a pairing of the apparatus with the communication node, the apparatus including
 an installation key for use in the pairing of the apparatus with the communication apparatus;
 a connection key to secure data transfer from the apparatus to the communication node, the apparatus being designed for use of the connection key defined in a course of pairing, for the data transfer to the communication node,
wherein upon replacing or reconnecting the communication node necessitating carrying out re-pairing, the apparatus is designed
 to check at least one criterion relating to reachability of the communication node, and
 to make a lack of reachability, determined based upon the check of the at least one criterion, into a prerequisite for using the installation key instead of the connection key for re-pairing.

At least one embodiment of the invention relates to a method for securing re-pairing of an apparatus for measuring or generating data with a communication node, the method comprising:
providing for routing of the data for cloud applications, via a communication node, including providing for wireless communication of the data to a communication node;
pairing the apparatus with the communication node, including using, at the apparatus, an installation key for carrying out the pairing with the communication apparatus;
securing transfer of data from the apparatus to the communication node, the data transfer being secured by the apparatus using a connection key, defined in the pairing, for the data transfer to the communication node,
wherein replacing or reconnecting the apparatus and the communication node necessitates carrying out re-pairing, the re-pairing including
 checking at least one criterion relating to reachability of the communication node, and
 making a lack of reachability, determined based upon the checking of the at least one criterion, into a prerequisite for using the installation key instead of the connection key for re-pairing.

At least one embodiment of the invention also relates to a method for securing re-pairing of an apparatus for measuring or generating data with a communication node, wherein at least one criterion relating to the reachability of the communication node is checked and the lack of reachability as per the criterion is made into the prerequisite for using the installation key instead of the connection key for re-pairing.

Finally, at least one embodiment of the invention also relates to a storage medium with software for carrying out a method according to at least one embodiment of the invention. In this case, consideration is given in particular to storage media from which apparatuses for measuring or generating data can download the software in order to upgrade them for a procedure according to at least one embodiment of the invention. At least one embodiment of the invention also relates to a non-transitory storage medium storing software for carrying out the method of an embodiment when executed by a processor.

BRIEF DESCRIPTION OF THE DRAWINGS

The subject matter of the invention is explained in greater detail below in the context of an example embodiment with reference to figures, in which.

DETAILED DESCRIPTION OF EXAMPLE EMBODIMENTS

Figure 1:
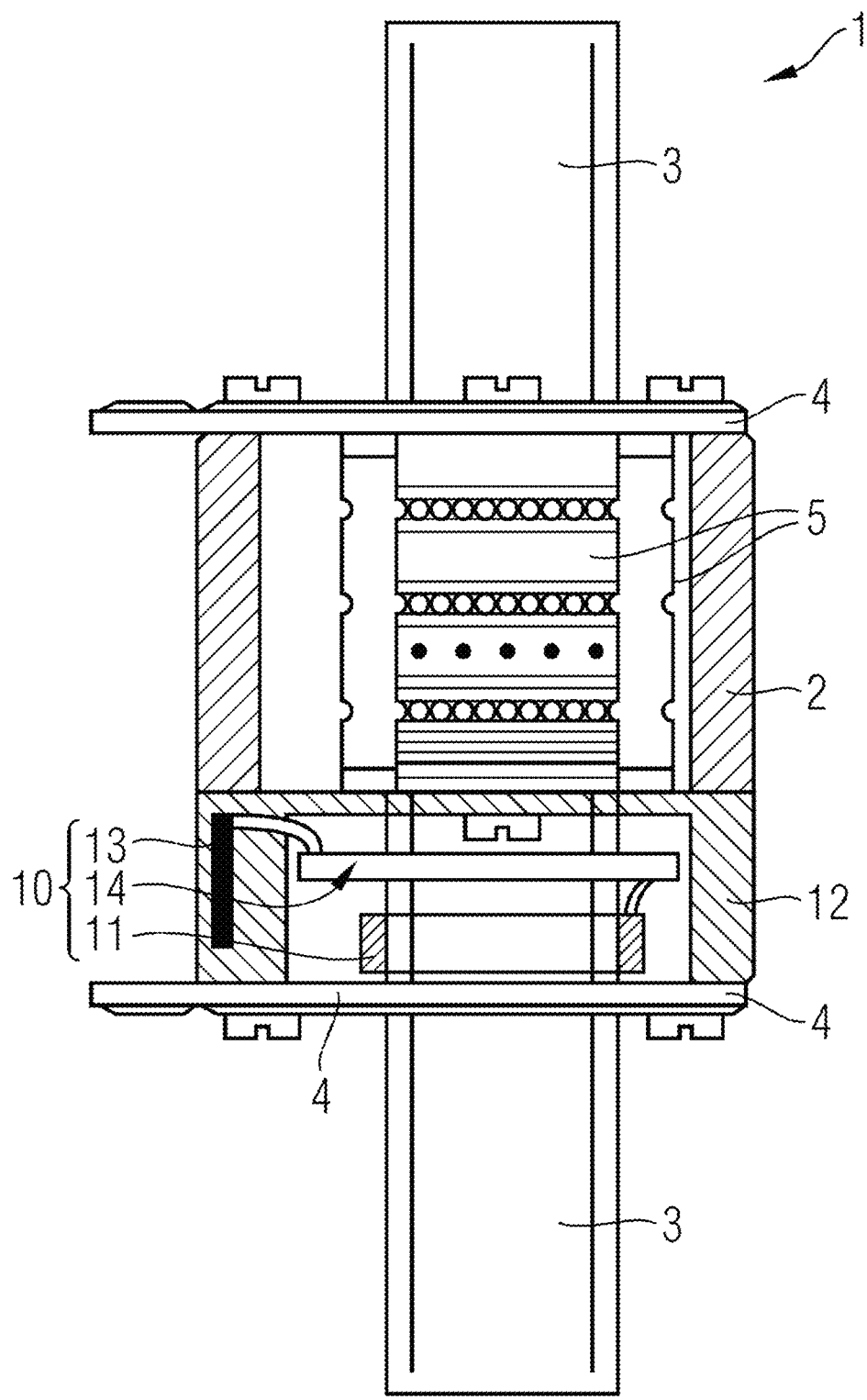
FIG. 1: shows a fusible link having a communication function, so-called Smart Fuse)

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

One embodiment of the invention relates to an apparatus for measuring or generating data. This can be for example a low-voltage protection apparatus that measures data (e.g. current, voltage, temperature information) or generates data (e.g. wear information from counting switching cycles). The provision of at least some of the data obtained in the apparatus for applications, in particular Cloud applications, is intended to be made possible. For this purpose, routing of the data via a communication node is provided. This involves a data collector or data concentrator, for example.

For the purpose of routing data, the apparatus is configured for wirelessly communicating the data to the communication node (e.g. via an integrated transmitting and receiving module).

Communicating the data to the communication node necessitates pairing the apparatus with the communication node. For this purpose, the apparatus has an installation key that is used for pairing.

Furthermore, data transfer from the apparatus to the communication node is provided, the data transfer being secured via a connection key, for which reason the apparatus is designed to use a connection key defined in the course of pairing for the data transfer to the communication node. The connection key differs from the installation key.

With regard to carrying out re-pairing, in particular when replacing the communication node by a different communication node, the apparatus is designed to check at least one criterion relating to the reachability of the communication node (to be replaced) and to make the lack of reachability as per the criterion into the prerequisite for using the installation key instead of the connection key for re-pairing. Re-pairing may also be necessary in the course of reconnecting a communication node e.g. after a software update or reboot. With regard to pairing of this type, too, the criterion relating to reachability can be checked.

In this way, security is increased and the risk of malicious attacks is reduced. In particular, spoofed pairing requests by third parties (e.g. man-in-the-middle attacks) are conceivable, in which a node impersonates a responsible data collector. Such attacks could firstly lead to the loss of data to the third party, and secondly interfere with data exchange with the authorized data collector (owing to the key being changed). These attacks are generally able to be detected and repelled by at least one embodiment of the invention.

For the criterion relating to the lack of reachability, the following two methods can be used, which can also be combined with one another.

The apparatus can be configured to receive at regular time intervals communicated from the communication node the local time thereof in order then to adopt the latter as its own local time. The failure of the communication of the local time of the communication node is then used as the criterion for the reachability of the communication node.

The apparatus can also be configured to receive a message through the communication node at regular time intervals (e.g. as a response to a notification from the apparatus to the communication node that causes the latter to transmit the message). The failure of the messages of the communication node to appear is then used as the criterion for the reachability of the communication node.

In accordance with one development, the apparatus can be configured to check a criterion relating to address information, in particular a MAC address, of the communication node, and to make the criterion relating to the address information into the additional prerequisite for using the installation key instead of the connection key for re-pairing. By way of example, in certain configurations it can be assumed that re-pairing is initiated only by either the same communication node or a different communication node with the same MAC address. The correspondence of the MAC address can then be used as an additional criterion.

At least one embodiment of the invention also relates to a method for securing re-pairing of an apparatus for measuring or generating data with a communication node, wherein at least one criterion relating to the reachability of the communication node is checked and the lack of reachability as per the criterion is made into the prerequisite for using the installation key instead of the connection key for re-pairing.

Finally, at least one embodiment of the invention also relates to a storage medium with software for carrying out a method according to at least one embodiment of the invention. In this case, consideration is given in particular to storage media from which apparatuses for measuring or generating data can download the software in order to upgrade them for a procedure according to at least one embodiment of the invention.

Figure 4:
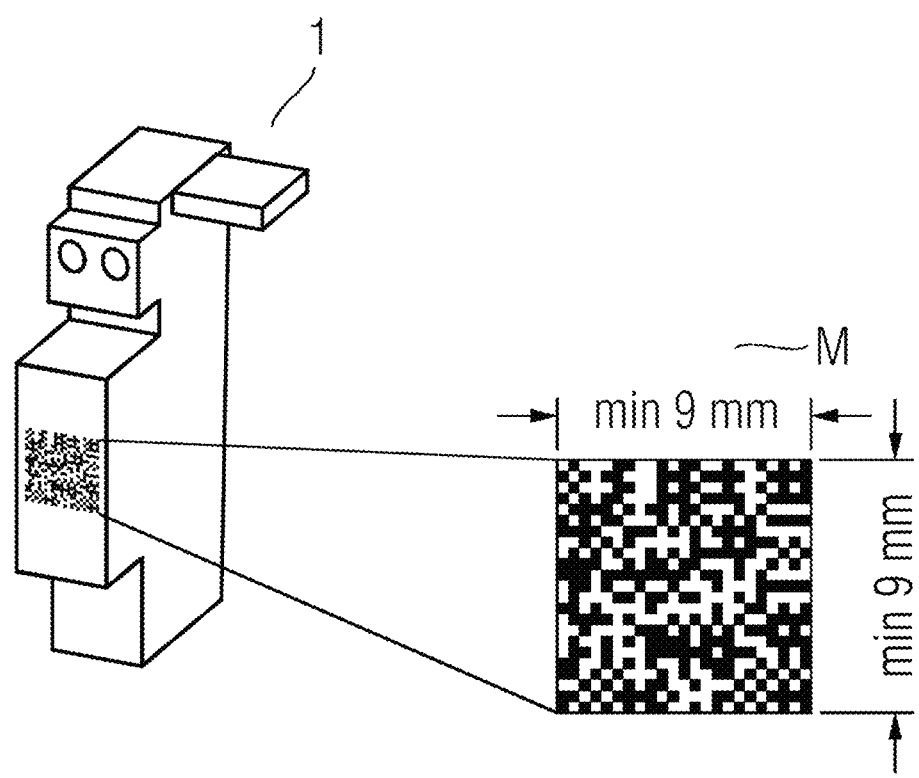
FIG. 4: shows a coding of initialization information on a fusible link in accordance with FIG. 1, FIG. 5: shows a flow diagram for pairing in accordance with the Zigbee protocol.

FIG. 4 shows a fusible link 1 equipped with sensor technology and communication functionality (e.g. in accordance with FIG. 1). A matrix code M is applied to this fusible link 1, the matrix code being illustrated in an enlarged view again alongside the fusible link. A QR code can also be used instead of a data matrix code. The code can be scanned with the aid of a suitable device. The device (generally a cell phone or tablet) has an App that extracts a pairing key (initialization key) and a MAC address relating to the device from the code and transfers them to a data collector.

Other methods for providing the initialization key are also conceivable. By way of example, the key can also be indicated directly on the fusible link, such that it can also be typed out.

In the course of pairing with a data collector, the initialization key is then replaced by a connection key (e.g. "link key" in the Zigbee protocol), which safeguards the connection between the fusible link and the data collector.

Figure 5:
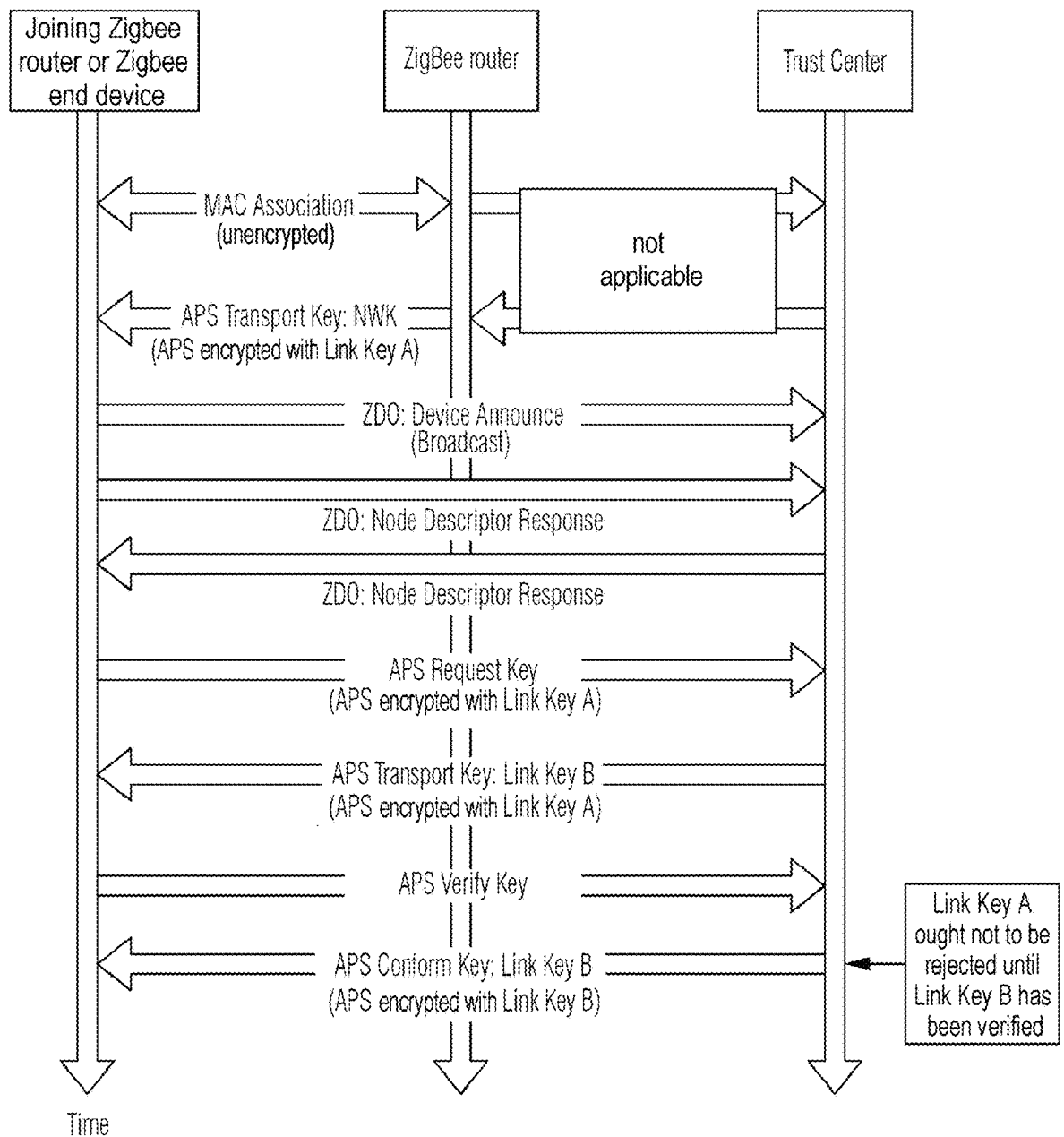

FIG. 5 shows pairing in accordance with the Zigbee protocol. The roles of "ZigBee end device", "ZigBee router" and "Trust Center" are defined therein. In the context of this example embodiment, the fusible link performs the role on the left in the figure ("Joining ZigBee router or ZigBee end device"). The roles of "ZigBee router" and "Trust Center" specified at the top in the figure are both fulfilled by the data collector. It is therefore indicated that the two pairing steps between "ZigBee router" and "Trust Center" are not applicable in the figure (indication "not applicable" in the figure).

As described above, by way of an App, the initialization key and the MAC address of the fuse were communicated to the data collector for the purpose of pairing. A connection is then set up between data collector and fuse by way of the MAC address (on the Medium Access Control (MAC) Layer in the Zigbee layer model). The communication is not secured on the MAC layer, but rather on higher layers in the layer model (Network (NKW) Layer or Application Support Layer (APS)). A more thorough explanation of the figure based upon the Zigbee protocol is not necessary for understanding the claimed invention. The elements used there (e.g. ZDO stands for "ZigBee Device Object" and supports the implementation of a "ZigBee end device" or a "ZigBee router") are known from the protocol specifications. All that is important here is that the initialization key (Link Key A in FIG. 5) is used first, but is then replaced by a different key (Link Key B in FIG. 5) for regular communication after pairing. This second key is also referred to hereinafter as connection key, although this term should not be understood to refer only to the Zigbee protocol. The considerations are equally applicable to any protocol in which an initialization key is used for pairing and is replaced by a different key (connection key) for communication after pairing.

An embodiment of the invention is based on the consideration that the disturbance of communication with the data collector generally indicates the requirement for re-pairing. In particular, in the case of an exchange of the data collector or in the case of functions being taken over by a different data collector, there will be no connectivity with the old data collector at least at times.

According to an embodiment of the invention, information that the data collector is not reachable is used as a prerequisite for resetting the connection key to the initial key.

This information can be generated e.g. by providing a regular message of the data collector at the fusible link. This can be implemented e.g. via a so-called watchdog functionality (e.g. software watchdog). A different, elegant possibility makes use of the functioning of the device time.

Figure 2:
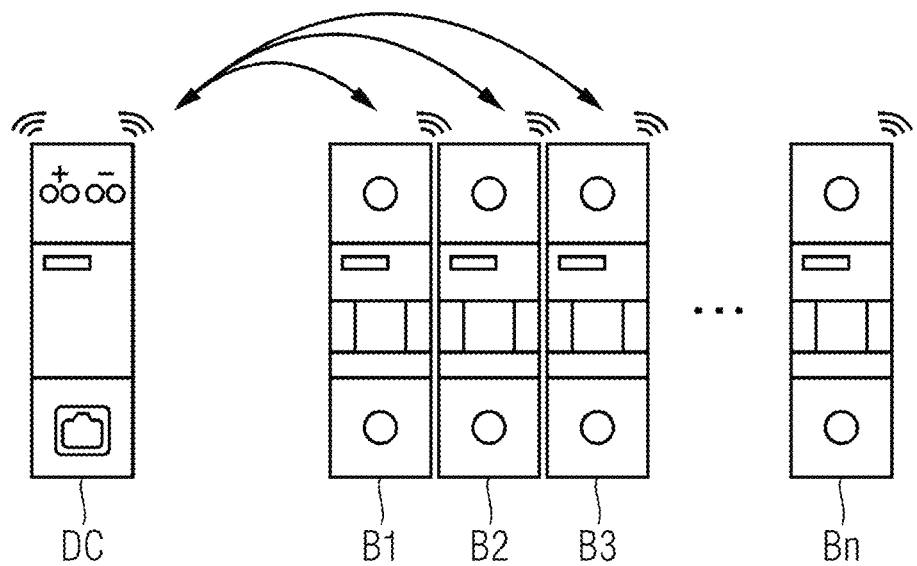
FIG. 2: shows a data collector and low-voltage protection apparatuses which are wirelessly connected to one another.
Figure 3:
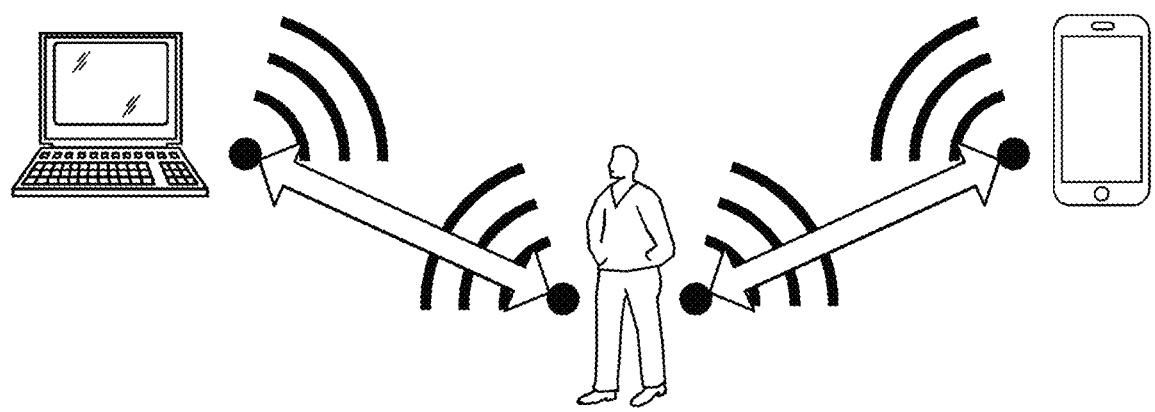
FIG. 3: shows a scenario of a "man-in-the-middle" manipulation.
Figure 6:
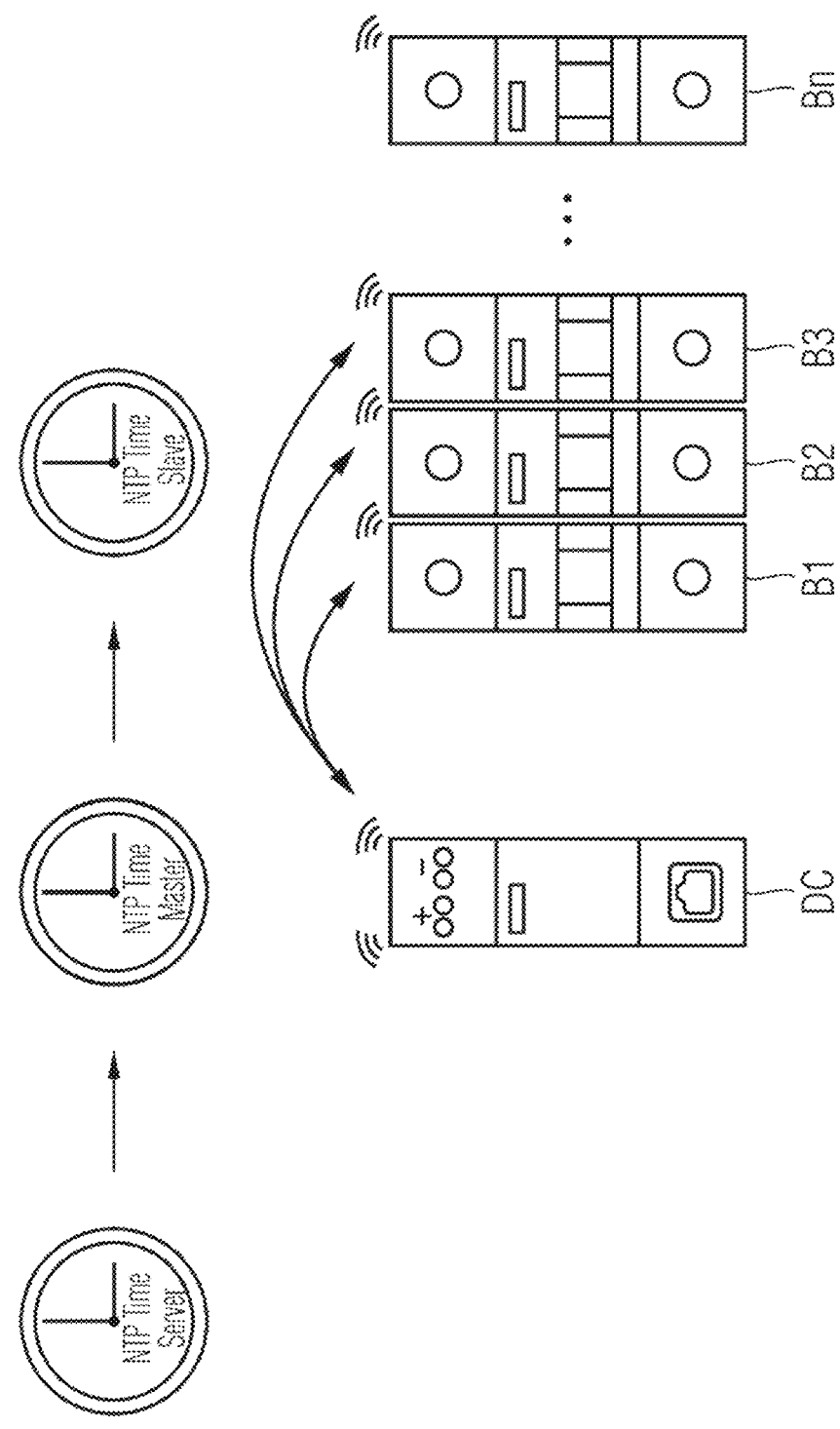
FIG. 6: shows an illustration for explaining the setting of the device time in the system interconnection.

FIG. 6 illustrates how the local time of the devices from FIG. 2 is defined with regard to correspondence to the real time and synchronism among one another. The local time of the data collector DC is obtained by way of a time server service (designated by "NPT Time Server" in the figure). The Network Time Protocol (NTP) is employed here. The local clock of the data collector (see the reference sign "NTP Time Master" in FIG. 5) and the clocks of the low-voltage apparatuses B1, B2, B3 and Bn (see the reference sign "NTP Time Slave" in FIG. 5) are in a master-slave relationship. That is to say that the low-voltage apparatuses B1, B2, B3 and Bn receive the local time of the data collector DC communicated at regular time intervals and set their clocks accordingly or accept the local time of the data collector DC. In this case, provision can also be made for synchronizing only low-voltage elements in which relatively large time deviations can occur in a manner dictated by the devices.

The device time is synchronized periodically (e.g. every 15 minutes) between the fuse from FIG. 1 and the associated data collector. The master-slave relationship discussed exists here, that is to say that the fuse accepts the device time of the data collector. Since the fuse in accordance with FIG. 1 generates its energy from their current flowing through it, there may be phases in which energy supply is absent and in which the local clock stops. This is corrected by accepting the time of the data collector. For this purpose, the fuse implements a timer that increases the device time every second. As a default time, 01.01.1970 0:00h is stored in the device. As soon as the first time synchronization with the data collector has taken place, the current time is used in the fuse. The fuse has a microcontroller that provides for incrementing the timer. The latter is active only as long as enough energy flows via the current paths. Therefore, the local time or device time of the fuse will always be less than or equal to the device time of the data collector. The failure of time synchronization or of a time stamp communicated by the data collector for a specific period of time (e.g. one hour) is then the criterion that the data collector is not reachable.

Figure 7:
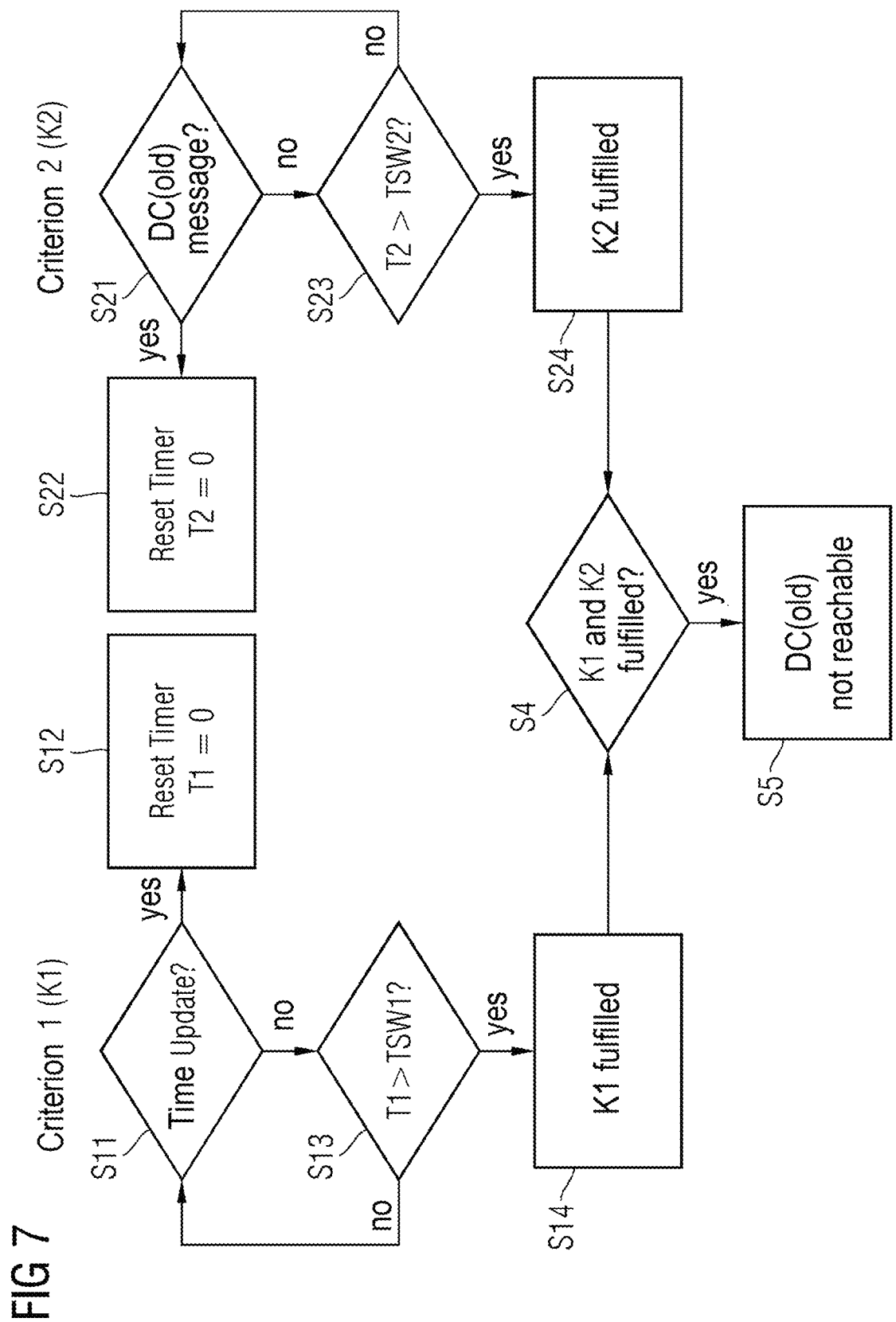
FIG. 7: shows a flow diagram for checking the reachability of a data collector.

The two methods described above for testing that the data collector is not reachable, namely via watchdog functionality and via monitoring the time synchronization, can also be combined. This is illustrated in FIG. 7. The latter illustrates on the left steps relating to time synchronization (criterion 1 or K1) and on the right steps relating to the watchdog messages (criterion 2 or K2). Step S11 (Time Update?) involves checking whether a new time stamp has been received. If so, an associated timer is set to the value zero in step S12 (Reset Timer T1=0). Otherwise, in step S13 (T1>TSW1?) a check is made to ascertain whether a threshold value TSW1 (e.g. 1 Hour) has been exceeded. If not, the method branches back to interrogation S11. If affirmative, in step S14 (K1 fulfilled) criterion 1 is deemed to be fulfilled and the method branches to step S2. In the case of criterion 2, step S21 (DC(old) Message?) involves checking whether the data collector has reported. If so, an associated timer is set to the value zero in step S22 (Reset Timer T2=0). Otherwise, in step S23 (T2>TSW2?) a check is made to ascertain whether a threshold value TSW2 (e.g. likewise one hour) has been exceeded. If not, the method branches to interrogation S21. If affirmative, in step S24 (K2 fulfilled) criterion 2 is deemed to be fulfilled and the method branches to step S2 (K1 and K2 fulfilled), which involves checking whether both criteria are fulfilled. If so, in step S5 (DC(old) not reachable) the non-reachability of the data collector is established, which is made into the prerequisite for re-pairing generally with a different data collector.

Figure 8:
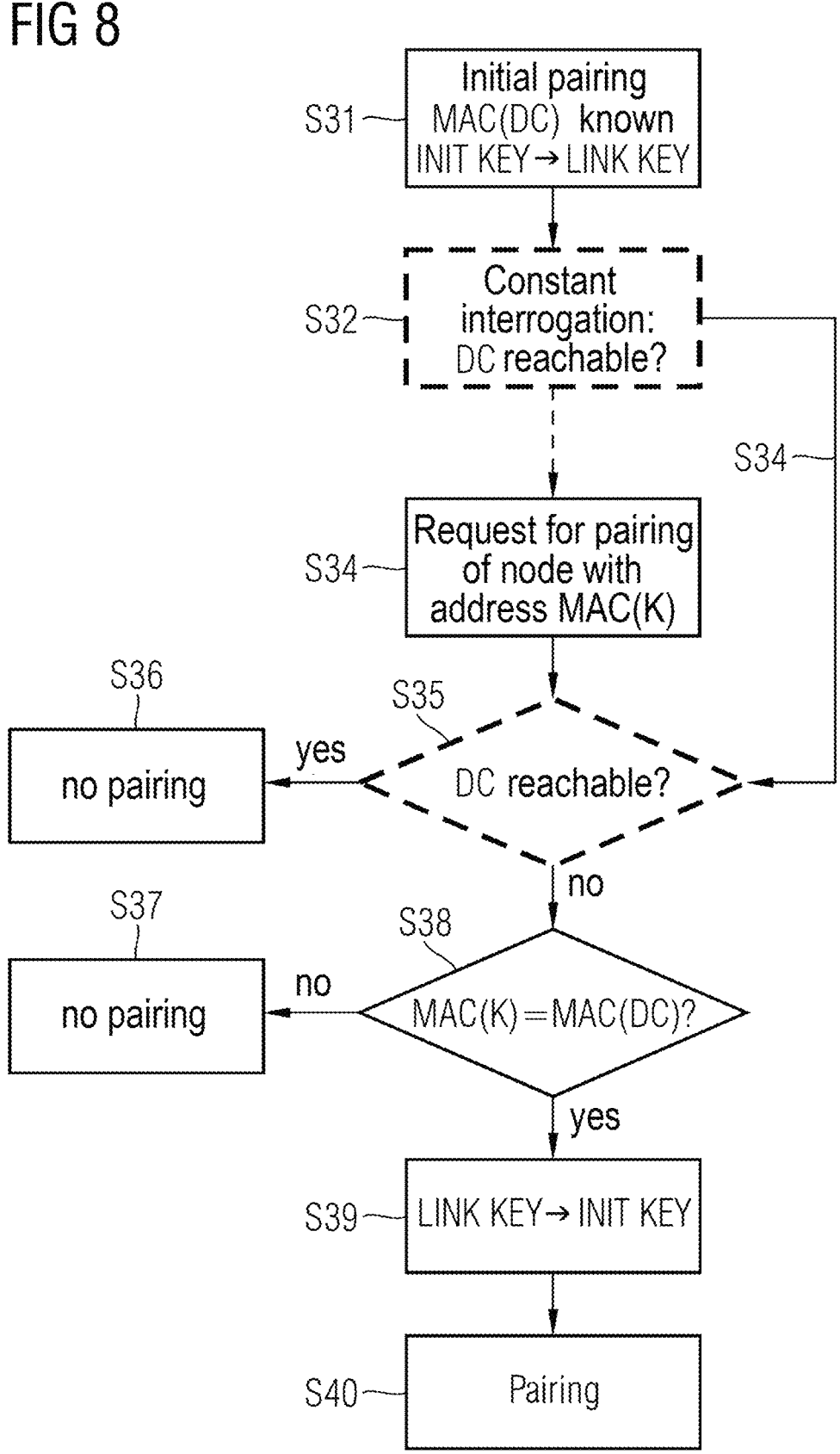
FIG. 8: shows a schematic illustration of the use of the result of checking the reachability of a data collector in the context of re-pairing.

The use of the criterion for reachability on re-pairing is shown in FIG. 8. In this case, step S32 (constant interrogation: DC reachable?), illustrated with dashed lines, represents an interrogation in accordance with FIG. 7. After an initial pairing in step S31 (initial pairing) with a data collector DC, the MAC address (MAC(DC)) of this data collector is known (illustrated by "MAC(DC) known" in the figure) and the initial key has been replaced by the connection key (in the figure "INIT KEY→LINK KEY"). The interrogation or checking of the reachability of the data collector DC is carried out constantly. The current result thereof is used in a re-pairing attempt. The pairing attempt is illustrated here in the figure by step S34 (Request for pairing of node with address MAC(K)). Interrogation S35 (DC reachable?) involves checking the current information with regard to the reachability of the data collector DC. The pairing does not occur if the data collector DC is reachable, which is illustrated by step S36 (no pairing) in the figure. It is also conceivable for this to be interpreted as an indication of possible intentional interference from outside and to lead to an alarm or even countermeasures. If the data collector DC was not reachable, a further interrogation involves checking whether the MAC address of the requesting node corresponds to the MAC address of the data collector (step S38: MAC(K)=MAC(DC)?). In the example embodiment it is assumed that the pairing request would have to come either from the original data collector DC or from a replacement data collector that has adopted the MAC address of the original data collector. Accordingly, pairing also does not take place if the MAC addresses deviate from one another (step S37: no pairing). It is only if the interrogation in S35 has turned out to be negative and that in S38 has turned out to be positive that the connection key is replaced by the initial key (step S39: LINK KEY→INIT KEY) and pairing is carried out (step S40: Pairing), wherein further steps in accordance with FIG. 5 can then be performed. In this case, it is also relevant for the communication key to be replaced only if the interrogation in S35 concerning reachability turns out to be negative in so far as after key replacement the original data collector DC can no longer communicate successfully with the fuse with the connection key of the initial pairing.

An embodiment of the invention has been explained above based upon a fusible link and a data collector connected by the Zigbee protocol, but is far from being restricted to this case, but rather is applicable to, in principle, arbitrary apparatuses for measuring or generating data with other protocols as well.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus for measuring or generating data, the apparatus comprising:
   an integrated transmitting and receiving module configured to wirelessly communicate the data to a communication node; and
   processing circuitry configured to cause the apparatus to
      pair the apparatus with the communication node using an installation key,
      define a connection key during the pairing, the connection key configured to secure data transfer from the apparatus to the communication node,
      transfer data to the communication node using the connection key,
      receive, from the communication node, a local time at a first regular time interval,
      receive a message from the communication node at a second regular time interval,
      adopt the received local time as an apparatus local time,
      re-pair, in response to replacing or reconnecting the communication node, the apparatus with the communication node by
         determining at least one criterion relating to reachability of the communication node,
         determining a first criterion, of the at least one criterion, in response to not receiving the local time at the first regular time interval,
         determining a second criterion of the at least one criterion in response to not receive the message from the communication node at the second regular time interval,
         determining that the communication node is not reachable in response to determining both of the first criterion and the second criterion, and
         re-pairing the apparatus with the communication node using the installation key instead of the connection key only in response to determining that the communication node is not reachable.

2. The apparatus of claim 1, wherein the processing circuitry is further configured to cause the apparatus to:
   determine a third criterion of the at least one criterion based on address information of the communication node; and determine that the communication node is unreachable in response to determining each of the first criterion, the second criterion, and the third criterion.

3. The apparatus of claim 1, wherein the apparatus is a low-voltage protection apparatus.

4. The apparatus of claim 3, wherein the apparatus is a fusible link.

5. The apparatus of claim 1, wherein the determining the first criterion includes determining the first criterion in response to the apparatus local time being greater than the local time.

6. A method for securing re-pairing of an apparatus for measuring or generating data with a communication node, the method comprising:
   routing the data via the communication node via wireless communication;
   pairing the apparatus with the communication node using an installation key;
   defining a connection key during the pairing, the connection key configured to secure data transfer from the apparatus to the communication node;
   receiving, from the communication node, a local time at a first regular time interval;
   adopting the received local time as an apparatus local time;
   receiving a message from the communication node at a second regular time interval; and
   re-pairing with the communication node in response to replacing or reconnecting the communication node necessitating the re-pairing, the re-pairing including determining at least one criterion relating to reachability of the communication node,
   determining a first criterion, of the at least one criterion, in response to not receiving the local time at the first regular time interval,
   determining a second criterion, of the at least one criterion, in response to not receiving the message from the communication node at the second regular time interval,
   determining that the communication node is not reachable in response to determining both of the first criterion and the second criterion, and
   re-pairing with the communication node using the installation key instead of the connection key only in response to determining that the communication node is not reachable.

7. The method of claim 6, further comprising:
   determining a third criterion, of the at least one criterion, based on address information of the communication node; and
   determining that the communication node is unreachable in response to determining each of the first criterion, the second criterion, and the third criterion.

8. A non-transitory computer-readable storage medium storing computer-readable instructions that, when executed, cause one or more processors to carry out the method of claim 6.

9. The method of claim 6, further comprising:
   determining a third criterion, of the at least one criterion, based on address information of the communication node,
   wherein the determining that the communication node is not reachable includes determining that the communication node is not reachable in response to determining each of the first criterion, the second criterion, and the third criterion.

* * * * *